United States Patent [19]

Menocal

[11] Patent Number: 4,662,180
[45] Date of Patent: May 5, 1987

[54] ISOTHERMALLY HEATSUNK DIFFUSION CLOUD CHAMBER REFRIGERATOR

[76] Inventor: Serafin G. Menocal, 30 Katherine St., Fair Haven, N.J. 07701

[21] Appl. No.: 900,983

[22] Filed: Aug. 27, 1986

[51] Int. Cl.[4] .............................................. F25B 21/02
[52] U.S. Cl. ........................................................ 62/3
[58] Field of Search .............................................. 62/3

[56] References Cited

U.S. PATENT DOCUMENTS

| | | | |
|---|---|---|---|
| 2,779,172 | 1/1957 | Lindenblad | 62/3 |
| 3,470,702 | 10/1969 | Koch et al. | 62/3 |
| 4,055,053 | 10/1977 | Elfving | 62/3 |
| 4,461,153 | 7/1984 | Lindner et al. | 62/3 |

Primary Examiner—Lloyd L. King

[57] ABSTRACT

A means of refrigeration is provided for a diffusion cloud chamber, which effects the temperatures required for operation of the cloud chamber by heatsinking a Peltier thermoelectric element with a two-phase saturated substance at equilibrium and constant pressure. Use is made of the fact that a two phase saturated substance at equilibrium and constant pressure is thermodynamically fixed in temperature. By sinking a Peltier thermoelectric element to this substance, the entire temperature difference across the Peltier thermoelectric element is offset below the saturation temperature of the two-phase substance. A diffusion cloud chamber incorporating this refrigerator could utilize ice-water cooling rather than dry ice, and therefore be easily set up in any classroom.

5 Claims, 3 Drawing Figures

ISOTHERMALLY HEATSUNK DIFFUSION CLOUD CHAMBER REFRIGERATOR

BACKGROUND OF THE INVENTION

1. Field of the Invention

The invention relates generally to a device for providing refrigeration to a diffusion cloud chamber.

2. Description of Prior Art

The diffusion cloud chamber is used to observe cosmic rays by making visible the trajectory of ionizing radiation. This instrument relies on the cooling of a vapor below its saturation temperature to a supersaturated state. If ionized nuclei are present, as would be created by cosmic rays, the excess vapor condenses on them to form a visible cloud trail.

Two cooling methods are presently used in diffusion cloud chambers, both of which have distinct disadvantages. The first uses a closed refrigeration cycle which is mechanically complex, inherently bulky, and expensive to implement. The second uses dry-ice to produce the required temperatures. Dry-ice is expensive, difficult to store and handle, and is not available commercially in many locations. As a result, the diffusion cloud chamber has found relatively little use, limited to universities and large research laboratories. This invention eliminates the cooling difficulties in the diffusion cloud chamber and allows operation in virtually any classroom.

SUMMARY OF THE INVENTION

This invention relates to a device for providing refrigeration in a diffusion cloud chamber. It comprises a Peltier thermoelectric element which removes heat from a cloud chamber cooling plate, and which pumps it to a heatsink made up of a two-phase saturated substance at equilibrium and constant pressure. Since the temperature of a two-phase saturated substance at equilibrium and constant pressure is thermodynamically "pinned" at the saturation temperature, the entire temperature differential across the Peltier thermoelectric element goes into reducing the cooling plate temperature.

It is the principal object of this invention to provide a device for cooling a diffusion cloud chamber, which will operate using an ice-water heatsink rather than dry-ice, and can therefore be easily and inexpensively set up in the classroom.

DESCRIPTION OF THE PREFERRED EMBODIMENT

Figure 1:
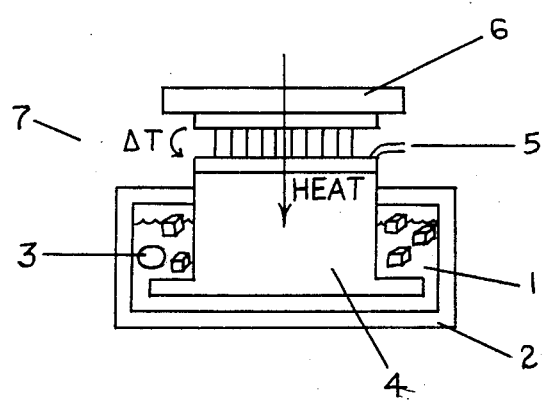
FIG. 1 is a view showing an embodiment of the "Isothermally Heatsunk Diffusion Cloud Chamber Refrigerator."

Referring to FIG. 1, an embodiment of the isothermally heatsunk diffusion cloud chamber refrigerator 7 is shown.

In this embodiment, a heatsink 1, consisting of two phases of a saturated substance in thermodynamic equilibrium is contained in reservoir 2. The pressure in the reservoir 2 is maintained near constant by a means of pressure damping 3, which expands or contracts to make up for volumetric changes in the two-phase substance as the ratio of the two components changes. With constant pressure, the temperature of the heatsink 1 is isothermal. Means of pressure damping 3 can be achieved by a small balloon in the reservoir. Other means to accomplish the same function would serve just as well. A means of transferring heat 4, consisting in the simplest case of a metal conductor, is in thermal contact with the two-phase heatsink 1, and therefore at nearly the same temperature.

In this embodiment, one face of Peltier thermoelectric element 5, the "hot" face, is in thermal contact with the means of transferring heat 4. The other face of the Peltier thermoelectric element 5, the "cold" face, is in thermal contact with cooling member 6.

The Peltier thermoelectric element 5 is so oriented, that electric current to this element removes heat from cooling member 6, and pumps it to the means of transferring heat 4. For a given drive current and heat load, the Peltier thermoelectric element[5] effects a finite temperature difference ($\Delta T$) across its two faces. Because the "hot" face of the Peltier thermoelectric element 5 is constrained to the equilibrium temperature of the two-phase heatsink 1 by conduction of heat through the means of transferring heat 4, the entire temperature difference ($\Delta T$) depresses the cooling member 6 temperature below the heatsink 1 two-phase saturation temperature.

Figure 2:
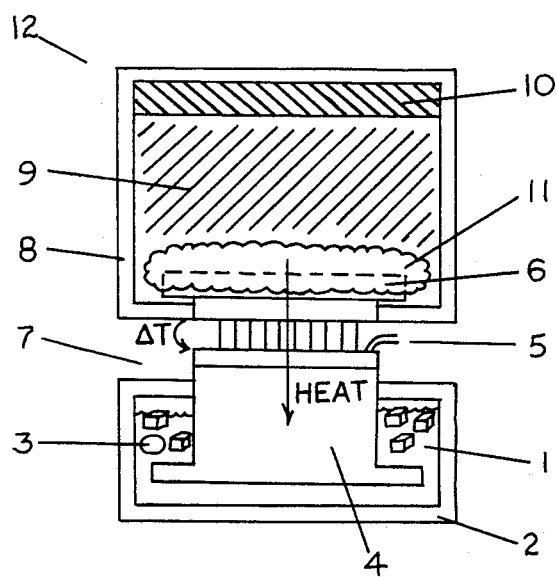
FIG. 2 is a view of the embodiment, showing how it connects to the diffusion cloud chamber.

Referring to FIG. 2, the connection of the isothermally heatsunk cloud chamber refrigerator 7 to the cloud chamber 12 is shown. The isothermally heatsunk cloud chamber refrigerator 7 is so oriented, that the cooling member 6 is located near the bottom of the cloud chamber viewing window 8. When vapor 9, emitted from the alcohol-soaked sponge 10 near the top of the cloud chamber 12 diffuses near the cooling member 6, heat is removed from the vapor 9, thereby lowering its temperature. A supersaturated vapor region 11 is formed above the cooling member 6, thereby forming the active medium in which nucleations caused by cosmic rays can be observed.

Figure 3:
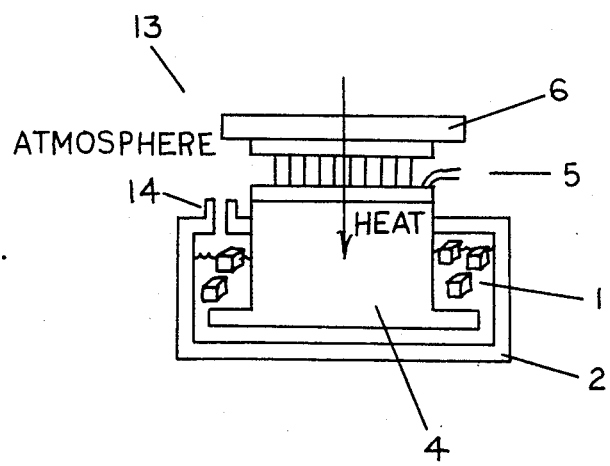
FIG. 3 is another embodiment of the "Isothermally Heatsunk Diffusion Cloud Chamber Refrigerator."

Referring to FIG. 3, another embodiment of the isothermally heatsunk cloud chamber refrigerator 13 is shown. In this embodiment, the heatsink 1 two-phase substance is maintained at near constant pressure by venting the reservoir 2 to atmosphere through vent 14. As such, the heatsink 1 two-phase substance is also thermodynamically constrained to near constant temperature. The means of pressure damping 3, referred to in FIG. 1 is not shown in FIG. 3, as it is automatically performed by the atmosphere 14 in this embodiment.

What is claimed is:

1. A diffusion cloud chamber isothermally heatsunk refrigerator which comprises:

(a) a heatsink consisting of two phases of a saturated substance existing in thermodynamic equilibrium at constant pressure and therefore at constant temperature, contained in a reservoir;

(b) a means of pressure damping to maintain constant pressure, as the ratio of the two phases present changes and introduces volumetric changes in the substance;

(c) a cooling member which transfer heat from vapor in contact with the cooling member surface to the "cold side" of a Peltier thermoelectric element with which the cooling member is in thermal contact;

(d) a Peltier thermoelectric element which removes the heat supplied by the cooling member from its "cold side" and pumps it to the "hot side" when driven by an electric current; and (e) a means of transferring heat from the "hot side" of the Peltier thermoelectric element to the two-phase isothermal substance in the reservoir.

2. A diffusion cloud chamber isothermally heatsunk refrigerator as described in claim 1, wherein the two-phase substance is maintained at constant pressure by venting to atmosphere.

3. A diffusion cloud chamber insothermally heatsunk refrigerator as described in claim 1, wherein the two-phase isothermal substance which is used is ice-water.

4. A diffusion cloud chamber isothermally heatsunk refrigerator as described in claim 1, wherein a metal conductor comprises the means of transferring heat from the "hot side" of the Peltier thermoelectric element to the isothermal two phase substance.

5. A diffusion cloud chamber isothermally heatsunk refrigerator as described in claim 1, wherein multiple Peltier thermoelectric elements are cascaded to remove heat from the cooling member and pump it, through the means of transferring heat, to the two-phase isothermal heatsink.

* * * * *